US012603056B2

(12) United States Patent
Yang et al.

(10) Patent No.: US 12,603,056 B2
(45) **Date of Patent: *Apr. 14, 2026**

(54) DATA DRIVING INTEGRATED CIRCUIT, DISPLAY APPARATUS, AND PIXEL COMPENSATION METHOD

(71) Applicant: BOE Technology Group Co., Ltd., Beijing (CN)

(72) Inventors: Fei Yang, Beijing (CN); Song Meng, Beijing (CN); Zhiqiang Dong, Beijing (CN); Yi Chen, Beijing (CN); Jingbo Xu, Beijing (CN); Jianbo Xian, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/782,025

(22) Filed: Jul. 24, 2024

(65) Prior Publication Data

US 2024/0404475 A1 Dec. 5, 2024

Related U.S. Application Data

(63) Continuation of application No. 17/762,347, filed as application No. PCT/CN2021/096006 on May 26, 2021, now Pat. No. 12,073,792.

(51) Int. Cl.
*G09G 3/3258* (2016.01)
*G09G 3/3291* (2016.01)

(52) U.S. Cl.
CPC ......... *G09G 3/3258* (2013.01); *G09G 3/3291* (2013.01); *G09G 2310/027* (2013.01);
(Continued)

(58) Field of Classification Search
CPC ............... G09G 3/3291; G09G 3/3258; G09G 2320/045; G09G 2230/00;
(Continued)

(56) References Cited

U.S. PATENT DOCUMENTS 10,930,215 B2 2/2021 Xu
2010/0034560 A1 * 2/2010 Tanaka ................ G03G 15/752 399/346
(Continued)

FOREIGN PATENT DOCUMENTS

CN 103578411 A 2/2014
CN 103886830 A 6/2014
(Continued)

OTHER PUBLICATIONS

International Search Report & Written Opinion mailed Jan. 27, 2022, regarding PCT/CN2021/096006.
(Continued)

*Primary Examiner* — Shaheda A Abdin
(74) *Attorney, Agent, or Firm* — Intellectual Valley Law, P.C.

(57) ABSTRACT

A data driving integrated circuit includes a digital-to-analog converter configured to receive a respective digital data signal from a timing controller and convert the respective digital data signal to a respective analog data signal, which is output to a display panel through a respective data line; an analog-to-digital converter configured to receive a respective analog sensing signal from a respective sensing line in the display panel and convert respective analog sensing signal to a respective digital sensing signal, which is output to the timing controller; a first sensing switch configured to control a connection between a first reference voltage line and the respective sensing line; a second sensing switch configured to control a connection between a second refer-
(Continued)

ence voltage line and the respective sensing line; and a third sensing switch configured to control the connection between the analog-to-digital converter and the respective sensing line.

19 Claims, 8 Drawing Sheets

(52) U.S. Cl.
CPC ................. *G09G 2320/045* (2013.01); *G09G 2320/0693* (2013.01); *G09G 2330/028* (2013.01)

(58) Field of Classification Search
CPC ....... G09G 2310/027; G09G 2330/028; G09G 2310/0259; G09G 2320/0233; G09G 2320/0247; G09G 2300/043; G09G 2330/12; G09G 2310/0291; G09G 2310/0278; G09G 2320/0693
See application file for complete search history.

(56) References Cited

U.S. PATENT DOCUMENTS

| | | | | |
|---|---|---|---|---|
| 2010/0073346 | A1 | 3/2010 | Min et al. | |
| 2010/0123693 | A1* | 5/2010 | Utsunomiya ........ | G09G 3/3696 345/205 |
| 2014/0022289 | A1* | 1/2014 | Lee ........................ | G09G 3/006 345/76 |
| 2014/0139510 | A1 | 5/2014 | Han et al. | |
| 2014/0176401 | A1 | 6/2014 | Kim et al. | |
| 2014/0176622 | A1 | 6/2014 | Jung et al. | |
| 2015/0090997 | A1* | 4/2015 | Yamamoto ............. | H10D 86/60 257/40 |
| 2015/0179105 | A1 | 6/2015 | Mizukoshi | |
| 2016/0148564 | A1* | 5/2016 | Kim ..................... | G09G 3/3233 345/82 |
| 2016/0189635 | A1* | 6/2016 | Lee ...................... | G09G 3/3291 345/77 |
| 2016/0351096 | A1 | 12/2016 | Tani et al. | |
| 2017/0061865 | A1 | 3/2017 | Park et al. | |
| 2017/0132977 | A1 | 5/2017 | Kim | |
| 2018/0053462 | A1* | 2/2018 | Bae ...................... | G09G 3/2074 |
| 2018/0182293 | A1 | 6/2018 | Chaji et al. | |

FOREIGN PATENT DOCUMENTS

| | | | |
|---|---|---|---|
| CN | 103903582 | A | 7/2014 |
| CN | 104732920 | A | 6/2015 |
| CN | 106205496 | A | 12/2016 |
| CN | 106486059 | A | 3/2017 |
| CN | 106683615 | A | 5/2017 |
| CN | 107615085 | A | 1/2018 |
| CN | 109637453 | A | 4/2019 |

OTHER PUBLICATIONS

Non-Final Office Action in the U.S. Appl. No. 17/762,347, dated Feb. 8, 2024.
Response to Non-Final Office Action in the U.S. Appl. No. 17/762,347, dated Apr. 30, 2024.
Notice of Allowance in the U.S. Appl. No. 17/762,347, dated May 24, 2024.

* cited by examiner

DATA DRIVING INTEGRATED CIRCUIT, DISPLAY APPARATUS, AND PIXEL COMPENSATION METHOD

CROSS-REFERENCE TO RELATED APPLICATION

This application is a continuation-in-part of U.S. application Ser. No. 17/762,347, filed May 26, 2021, which is a national stage application under 35 U.S.C. § 371 of International Application No. PCT/CN2021/096006, filed May 26, 2021. Each of the forgoing applications is herein incorporated by reference in its entirety for all purposes.

TECHNICAL FIELD

The present invention relates to display technology, more particularly, to a data driving integrated circuit, a display apparatus, and a pixel compensation method.

BACKGROUND

In organic light-emitting diode (OLED) display apparatus, a pixel-driving circuit includes a driving transistor for controlling a driving current flowing through an organic light-emitting diode. Due to instability in fabrication process, device parameter drifting, and aging of transistor, the driving current may vary from one transistor to another and drift over time, leading to non-uniformity issue across subpixels in a display apparatus. Pixel compensation may be used for compensating the voltage signal or current signal.

SUMMARY

In one aspect, the present disclosure provides a display apparatus, comprising a data driving integrated circuit; a plurality of data lines respectively coupled to the data driving integrated circuit; a plurality of sensing line respectively coupled to the data driving integrated circuit; wherein a respective sensing line of the plurality of sensing line is coupled to a plurality of columns of pixel driving circuits; and at least two subpixels in a same row are coupled to a same sensing line.

Optionally, the respective sensing line is coupled to n columns of pixel driving circuits, n number of pixel driving circuits in a respective row of n columns of pixel driving circuits being respectively connected to n number of light emitting elements respectively in n number of subpixels.

Optionally, the respective sensing line is coupled to 2n columns of pixel driving circuits, 2n number of pixel driving circuits in a respective row of 2n columns of pixel driving circuits being respectively connected to 2n number of light emitting elements respectively in 2n number of subpixels.

Optionally, the display apparatus further comprises a plurality of pixel driving circuits and a plurality of light emitting diodes; wherein a respective pixel driving circuit comprises a storage capacitor having a first capacitor electrode coupled to a first node and a second capacitor electrode coupled to a second node; a driving transistor having a first electrode coupled to a respective voltage supply line, a second electrode coupled to the second node, and a gate electrode coupled to the first node; a switching transistor having a first electrode coupled to a respective data line, a second electrode coupled to the first node, and a gate electrode coupled to a respective first gate line; and a sensing transistor having a first electrode coupled to the respective sensing line, a second electrode coupled to the second node, and a gate electrode coupled to a respective second gate line.

Optionally, the data driving integrated circuit comprises a digital-to-analog converter configured to receive a respective digital data signal from a timing controller and convert the respective digital data signal to a respective analog data signal, which is output to a display panel through a respective data line; an analog-to-digital converter configured to receive a respective analog sensing signal from a respective sensing line in the display panel and convert respective analog sensing signal to a respective digital sensing signal, which is output to the timing controller; a first sensing switch configured to control a connection between a first reference voltage line and the respective sensing line; a second sensing switch configured to control a connection between a second reference voltage line and the respective sensing line; and a third sensing switch configured to control the connection between the analog-to-digital converter and the respective sensing line.

Optionally, the first reference voltage line configured to provide a first reference voltage signal; and the second reference voltage line configured to provide a second reference voltage signal.

In another aspect, the present disclosure provides a pixel compensation method, comprising in a sensing voltage write-in stage, providing a turning-on voltage signal to a respective first gate line to turn on a switching transistor in a respective pixel driving circuit; providing a turning-on voltage signal to a respective second gate line to turn on a sensing transistor in the respective pixel driving circuit; controlling a first sensing switch of a data driving integrated circuit in a conductive state to electrically connect a first reference voltage line to a respective sensing line while maintaining a second sensing switch and a third sensing switch of the data driving integrated circuit in a non-conductive state; providing a first reference voltage signal to the respective sensing line through the first reference voltage line; and providing a sensing voltage signal to a first electrode of the switching transistor through a respective data line, the sensing voltage signal passing through the switching transistor to a first node coupled to a gate electrode of a driving transistor, a drain electrode of the switching transistor, and a first capacitor electrode of a storage capacitor.

Optionally, the second sensing switch is configured to control a connection between a second reference voltage line and the respective sensing line; and the third sensing switch is configured to control a connection between an analog-to-digital converter of the data driving integrated circuit and the respective sensing line.

Optionally, the pixel compensation method further comprises, in a charging stage, controlling the first sensing switch, the second sensing switch, and the third sensing switch of the data driving integrated circuit respectively in a non-conductive state; providing a turning-off voltage signal to the respective first gate line to turn off the switching transistor in the respective pixel driving circuit; providing a turning-on voltage signal to the respective second gate line to turn on the sensing transistor in the respective pixel driving circuit; and providing a voltage signal to a respective voltage supply line coupled to a first electrode of the driving transistor, allowing a charging current to flow through the driving transistor, thereby charging the respective sensing line.

Optionally, the respective sensing line is charged from a voltage level of the first reference voltage signal to a voltage level within a conversion voltage range of an analog-to-digital converter of the data driving integrated circuit.

Optionally, the pixel compensation method further comprises discontinuing data voltage signal to any data line.

Optionally, the pixel compensation method further comprises, in a sensing stage subsequent to a charging stage, controlling the third sensing switch of the data driving integrated circuit in a conductive state to electrically connect the respective sensing line to an analog-to-digital converter while maintaining the first sensing switch and the second sensing switch of the data driving integrated circuit in a non-conductive state.

Optionally, the pixel compensation method further comprises, in a conversion stage, converting a respective analog sensing signal from a respective sensing line to a respective digital sensing signal; and outputting a respective digital sensing signal to a timing controller.

Optionally, the pixel compensation method further comprises, in a data write-back stage subsequent to a charging stage and a conversion stage, controlling the second sensing switch of the data driving integrated circuit in a conductive state to electrically connect a second reference voltage line to the respective sensing line while maintaining the first sensing switch and the third sensing switch of the data driving integrated circuit in a non-conductive state; providing a second reference voltage signal to the respective sensing line through the second reference voltage line; providing the turning-on voltage signal to the respective first gate line to turn on the switching transistor in a respective pixel driving circuit; providing the turning-on voltage signal to the respective second gate line to turn on the sensing transistor in the respective pixel driving circuit; and providing a respective data signal to the first electrode of the switching transistor through the respective data line, the respective data signal passing through the switching transistor to the first node; wherein the second reference voltage signal has a voltage level higher than a voltage level of the first reference voltage signal.

Optionally, the pixel compensation method further comprises, in an idle stage subsequent to the data write-back stage, controlling the first sensing switch, the second sensing switch, and the third sensing switch of the data driving integrated circuit respectively in the non-conductive state; providing a turning-off voltage signal to the respective first gate line to turn off the switching transistor in the respective pixel driving circuit; and providing a turning-on voltage signal to the respective second gate line to turn on the sensing transistor in the respective pixel driving circuit.

Optionally, the pixel compensation method further comprises, in the idle stage, discontinuing data voltage signal to any data line.

Optionally, the pixel compensation method further comprises, in an image display period subsequent to a sensing period, controlling the second sensing switch of the data driving integrated circuit in a conductive state to electrically connect a second reference voltage line to the respective sensing line while maintaining the first sensing switch and the third sensing switch of the data driving integrated circuit in a non-conductive state; providing a second reference voltage signal to the respective sensing line through the second reference voltage line; providing the turning-on voltage signal to the respective first gate line to turn on the switching transistor in a respective pixel driving circuit; providing the turning-on voltage signal to the respective second gate line to turn on the sensing transistor in the respective pixel driving circuit; and providing a respective data signal to the first electrode of the switching transistor through the respective data line, the respective data signal passing through the switching transistor to the first node; wherein the second reference voltage signal has a voltage level higher than a voltage level of the first reference voltage signal.

Optionally, the sensing voltage signal comprises consecutively a first low voltage level, a first high voltage level, a second high voltage level, and a second low voltage level; wherein the first high voltage level is higher than the second high voltage level; and the second high voltage level is higher than a voltage level of a threshold voltage of the driving transistor.

Optionally, the pixel compensation method further comprises calibrating a plurality of analog-to-digital converters in one or more data driving integrated circuits in a display apparatus with respect to each other; wherein calibrating the plurality of analog-to-digital converters comprises, in a first calibration stage, controlling the second sensing switch of a respective data driving integrated circuit in a conductive state to electrically connect a second reference voltage line to the respective sensing line while maintaining the first sensing switch and the third sensing switch of the respective data driving integrated circuit in a non-conductive state; and providing a second reference voltage signal to the respective sensing line through the second reference voltage line; wherein calibrating the plurality of analog-to-digital converters further comprises, in a second calibration stage, controlling the third sensing switch of the respective data driving integrated circuit in a conductive state to electrically connect the respective sensing line to a respective analog-to-digital converter while maintaining the first sensing switch and the second sensing switch of the respective data driving integrated circuit in a non-conductive state; converting a respective analog sensing signal to a respective digital sensing signal by the respective analog-to-digital converter; and outputting a respective digital sensing signal to a timing controller; wherein values of a plurality of analog sensing signals respectively converted by the plurality of analog-to-digital converters are used for calibrating the plurality of analog-to-digital converters with respect to each other.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a data driving integrated circuit, a display apparatus, and a pixel compensation method that substantially obviate one or more of the problems due to limitations and disadvantages of the related art. In one aspect, the present disclosure provides a data driving integrated circuit. In some embodiments, the data driving integrated circuit includes a digital-to-analog converter configured to receive a respective digital data signal from a timing controller and convert the respective digital data signal to a respective analog data signal, which is output to a display panel through a respective data line; an analog-to-digital converter configured to receive a respective analog sensing signal from a respective sensing line in the display panel and convert respective analog sensing signal to a respective digital sensing signal, which is output to the timing controller; a first sensing switch configured to control a connection between a first reference voltage line and the respective sensing line; a second sensing switch configured to control a connection between a second reference voltage line and the respective sensing line; and a third sensing switch configured to control the connection between the analog-to-digital converter and the respective sensing line.

Figure 1:
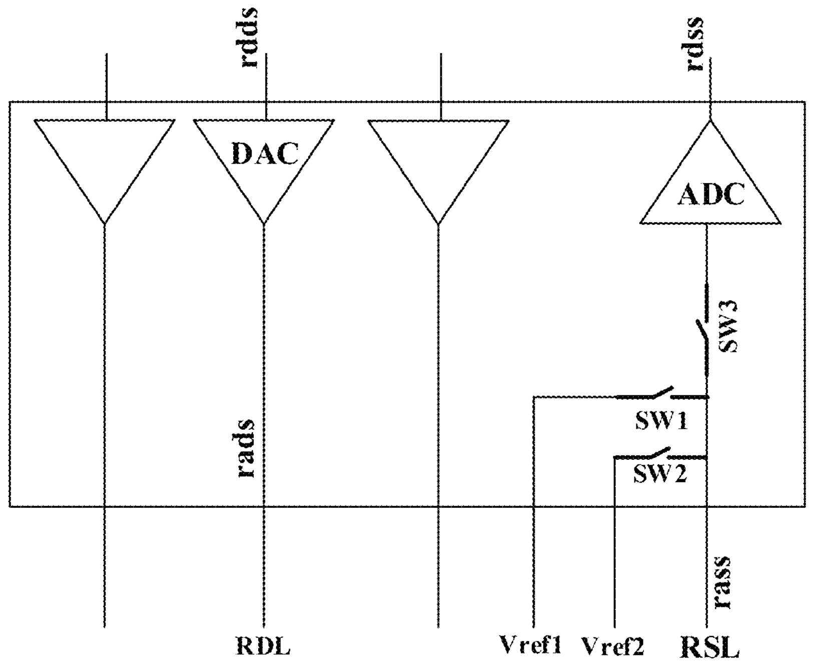
FIG. 1 is a schematic diagram illustrating the structure of a data driving integrated circuit in some embodiments according to the present disclosure.

FIG. 1 is a schematic diagram illustrating the structure of a data driving integrated circuit in some embodiments according to the present disclosure. Referring to FIG. 1, the data driving integrated circuit in some embodiments includes a digital-to-analog converter DAC, an analog-to-digital converter ADC, a first sensing switch SW1, a second sensing switch SW2, and a third sensing switch SW3. As shown in FIG. 1, the digital-to-analog converter DAC is configured to receive a respective digital data signal rdds from a timing controller and convert the respective digital data signal rdds to a respective analog data signal rads, which is output to a display panel through a respective data line RDL. The analog-to-digital converter ADC is configured to receive a respective analog sensing signal rass from a respective sensing line RSL in the display panel and convert respective analog sensing signal rass to a respective digital sensing signal rdss, which is output to the timing controller. The first sensing switch SW1 is configured to control a connection between a first reference voltage line Vref1 and the respective sensing line RSL. The second sensing switch SW2 is configured to control a connection between a second reference voltage line Vref2 and the respective sensing line RSL. The third sensing switch SW3 is configured to control the connection between the analog-to-digital converter ADC and the respective sensing line RSL.

Optionally, the first reference voltage line Vref1 is configured to provide a first reference voltage signal. Optionally, the second reference voltage line Vref2 is configured to provide a second reference voltage signal. Optionally, the second reference voltage signal has a voltage level higher than a voltage level of the first reference voltage signal.

In another aspect, the present disclosure provides a display apparatus having the data driving integrated circuit described herein. In some embodiments, the display apparatus further includes a plurality of data lines respectively coupled to the data driving integrated circuit; a plurality of sensing line respectively coupled to the data driving integrated circuit; the first reference voltage line configured to provide a first reference voltage signal; and the second reference voltage line configured to provide a second reference voltage signal.

Figure 2:
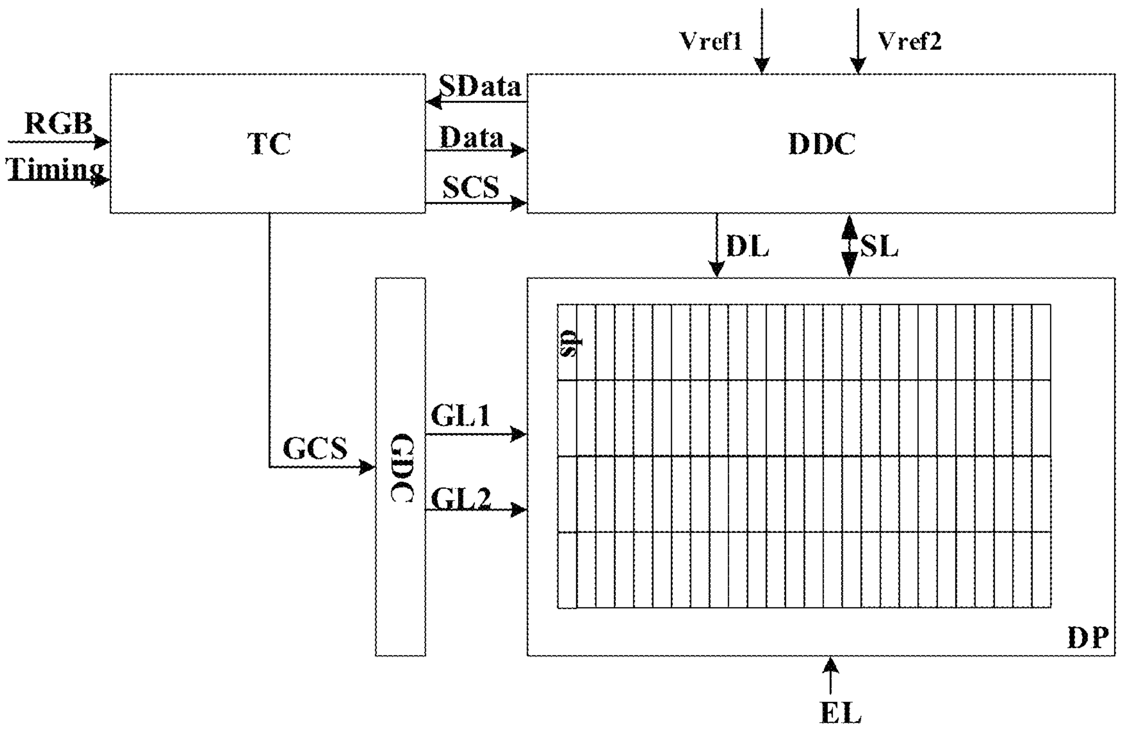
FIG. 2 is a schematic diagram illustrating the structure of a display apparatus in some embodiments according to the present disclosure.

FIG. 2 is a schematic diagram illustrating the structure of a display apparatus in some embodiments according to the present disclosure. Referring to FIG. 2, the display apparatus in some embodiments includes a display panel DP having an array of subpixels sp; one or more gate driving circuits GDC electrically connected to a plurality of first gate lines GL1 and a plurality of second gate lines GL2; a data driving circuit DDC electrically connected to a plurality of data lines DL and a plurality of sensing lines SL; and a timing controller TC. The timing controller TC is configured to receive image data ("RGB") and timing data ("Timing") from an external device such as a host. The image data RGB includes a plurality of input pixel data respectively for a plurality of pixels. Each of the input pixel data may include red grayscale data R, green grayscale data G, and blue grayscale data B for a respective one of the plurality of pixels. The timing controller TC is configured to control the operations of the one or more gate driving circuits GDC and the data driving circuit DDC. In one example, the timing controller TC is configured to output a plurality of digital data signals ("Data") to the data driving circuit DDC. In another example, the plurality of digital data signals ("Data") are compensated data signals. In another example, the timing controller TC is configured to receive a plurality of digital sensing signals ("Sdata") from the data driving circuit DDC. In another example, the timing controller TC is configured to output a plurality of source control signals ("SCS") to the data driving circuit DDC. In another example, the timing controller TC is configured to output a plurality of gate control signals ("GCS") to the one or more gate driving circuits GDC.

In some embodiments, the display apparatus further includes a plurality of voltage supply lines EL. In one example, the plurality of voltage supply lines EL includes one or more high voltage supply lines (e.g., a Vdd signal line configured to provide a VDD signal). In another example, the plurality of voltage supply lines EL includes one or more low voltage supply lines (e.g., a Vss signal line configured to provide a VSS signal).

In some embodiments, the display apparatus further includes a first reference voltage line Vref1 and a second reference voltage line Vref2. Optionally, the first reference voltage line Vref1 is configured to provide a first reference voltage signal. Optionally, the second reference voltage line Vref2 is configured to provide a second reference voltage signal. Optionally, the second reference voltage signal has a voltage level higher than a voltage level of the first reference voltage signal.

Figure 3:
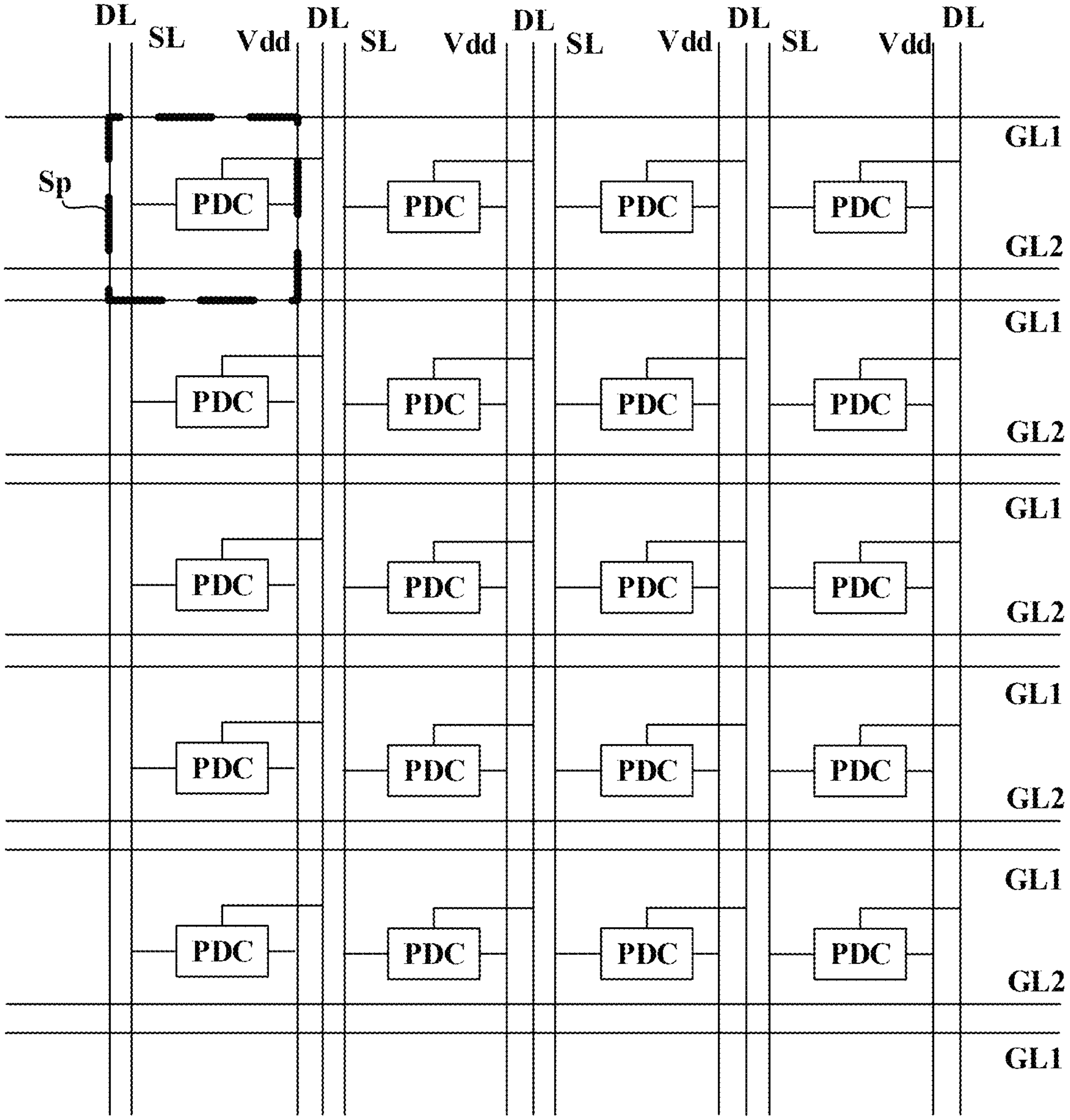
FIG. 3 is a schematic diagram illustrating the structure of a display apparatus in some embodiments according to the present disclosure.

FIG. 3 is a plan view of a display apparatus in some embodiments according to the present disclosure. Referring to FIG. 3, the display apparatus in some embodiments includes an array of subpixels Sp. Each subpixel includes an electronic component, e.g., a light emitting element. In one example, the light emitting element is driven by a respective pixel driving circuit PDC. The display apparatus includes a plurality of first gate lines GL1, a plurality of second gate lines GL2, a plurality of data lines DL, a plurality of sensing lines SL, a plurality of voltage supply line Vdd. Light emission in a respective subpixel sp is driven by a respective pixel driving circuit PDC. In one example, a high voltage signal (e.g., a VDD signal) is input, through a high voltage supply line, to the respective pixel driving circuit PDC connected to an anode of the light emitting element; a low voltage signal (e.g., a VSS signal) is input, through a low voltage supply line, to a cathode of the light emitting element. A voltage difference between the high voltage signal (e.g., the VDD signal) and the low voltage signal (e.g., the VSS signal) is a driving voltage $\Delta V$ that drives light emission in the light emitting element. In one example as shown in FIG. 3, a total number of the plurality of data lines DL is the same as a total number of the plurality of sensing lines SL. The large number of signal lines in the display apparatus requires additional integrated circuits, and also results in a lower aperture ratio.

Figure 4:
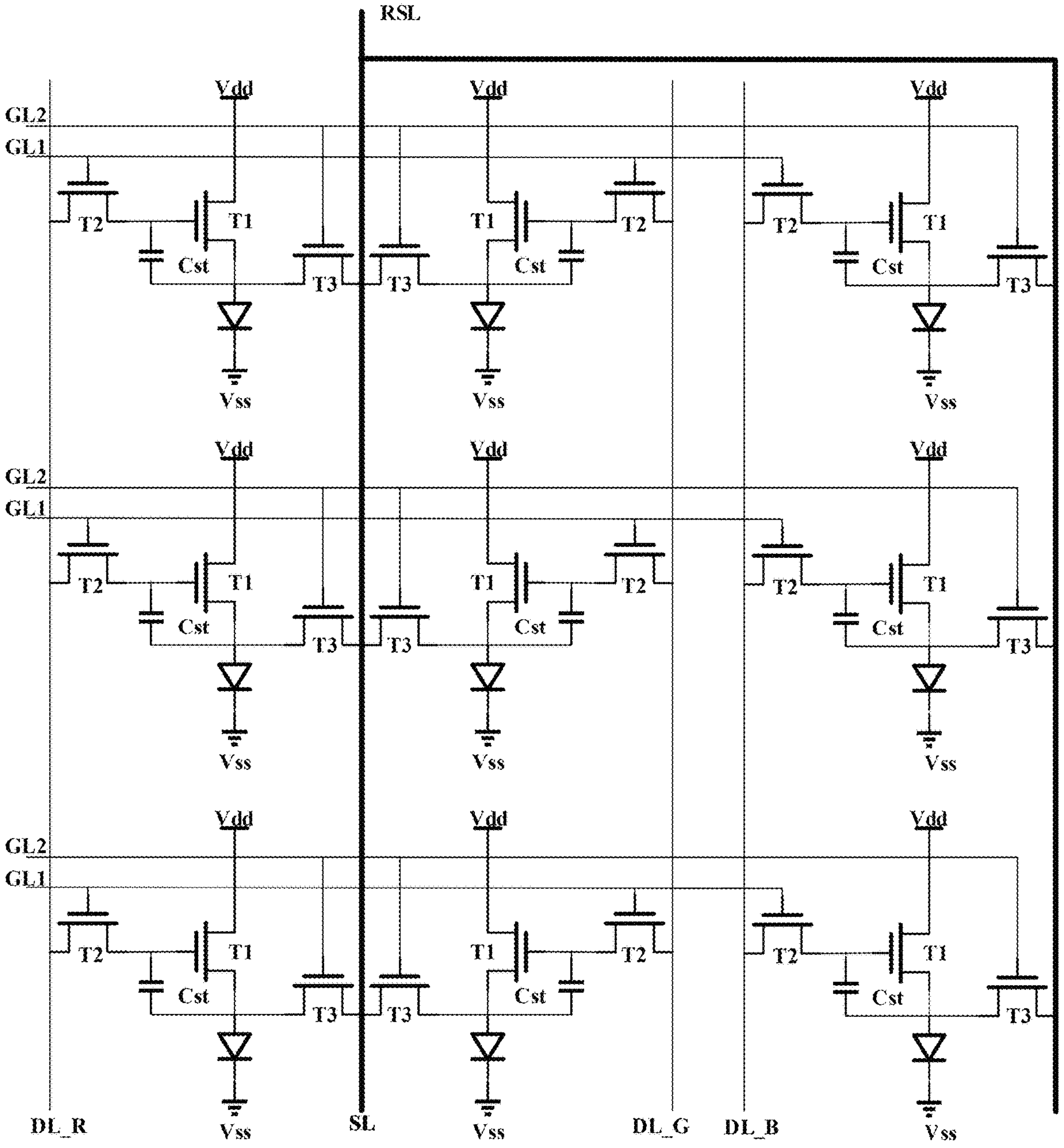
FIG. 4 is a schematic diagram illustrating the structure of a display apparatus in some embodiments according to the present disclosure.

FIG. 4 is a schematic diagram illustrating the structure of a display apparatus in some embodiments according to the present disclosure. Referring to FIG. 4, in some embodiments, a respective sensing line RSL is coupled to a plurality of columns of pixel driving circuits. In FIG. 4, a display apparatus having a RGB format is depicted. A respect pixel in the display apparatus includes a red subpixel, a green subpixel, and a blue subpixel. The plurality of data lines include data lines connected to red subpixels ("DL_R"), data lines connected to green subpixels ("DL_G"), and data lines connected to blue subpixels ("DL_B").

In some embodiments, the respective sensing line RSL is coupled to n columns of pixel driving circuits, n number of pixel driving circuits in a respective row of the n columns of pixel driving circuits being respectively connected to n number of light emitting elements respectively in n number of subpixels. Optionally, n stands of a number of subpixels of different colors in a respective pixel. In one example, the respective pixel includes a red subpixel, a green subpixel, and a blue subpixel, and n=3.

Figure 5:
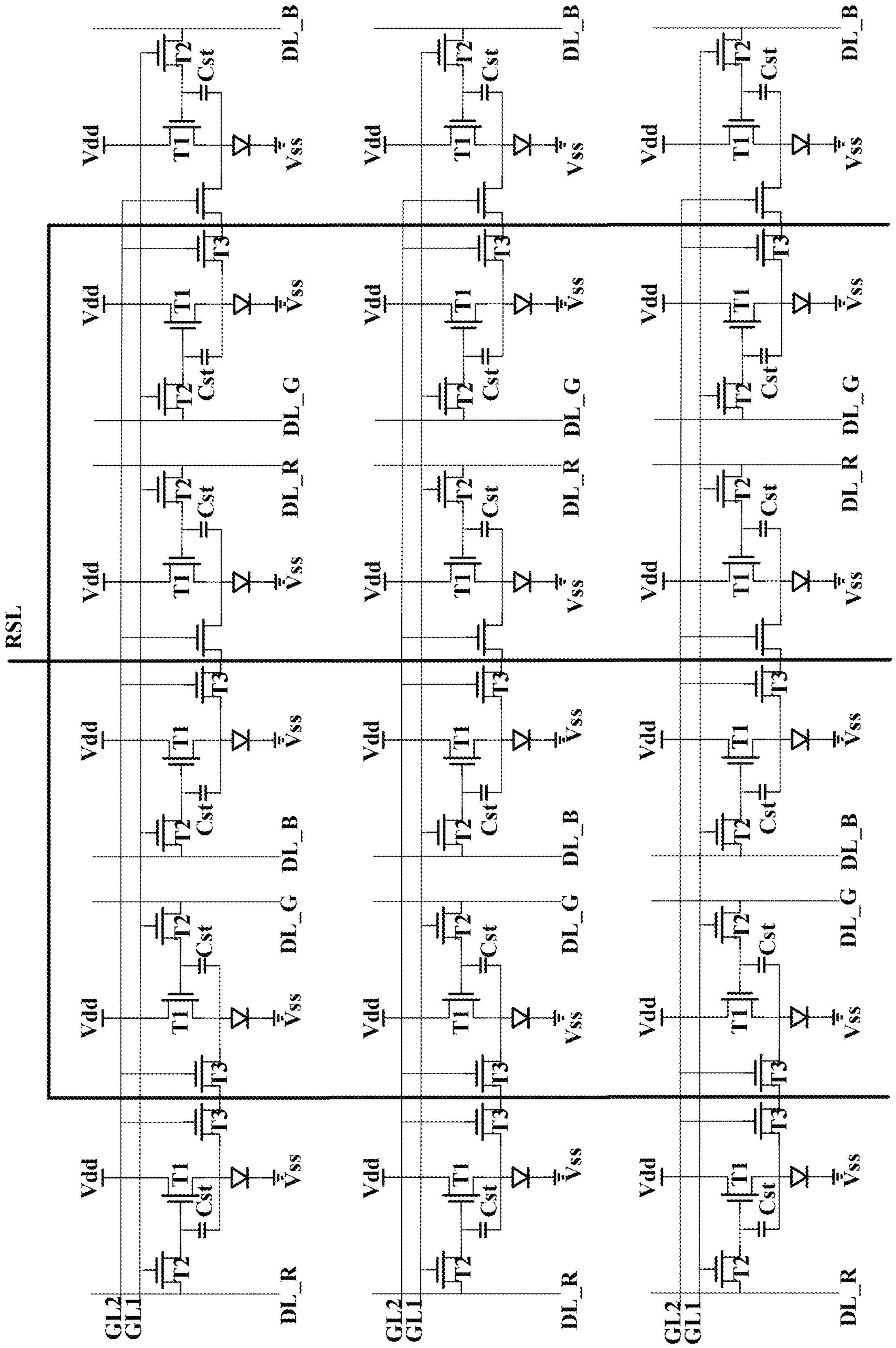
FIG. 5 is a schematic diagram illustrating the structure of a display apparatus in some embodiments according to the present disclosure.

FIG. 5 is a schematic diagram illustrating the structure of a display apparatus in some embodiments according to the present disclosure. Referring to FIG. 5, the respective sensing line RSL in some embodiments is coupled to 2n columns of pixel driving circuits, 2n number of pixel driving circuits in a respective row of the 2n columns of pixel driving circuits being respectively connected to 2n number of light emitting elements respectively in 2n number of subpixels. Optionally, n stands of a number of subpixels of different colors in a respective pixel. In one example, the respective pixel includes a red subpixel, a green subpixel, and a blue subpixel, and n=3.

Figure 6:
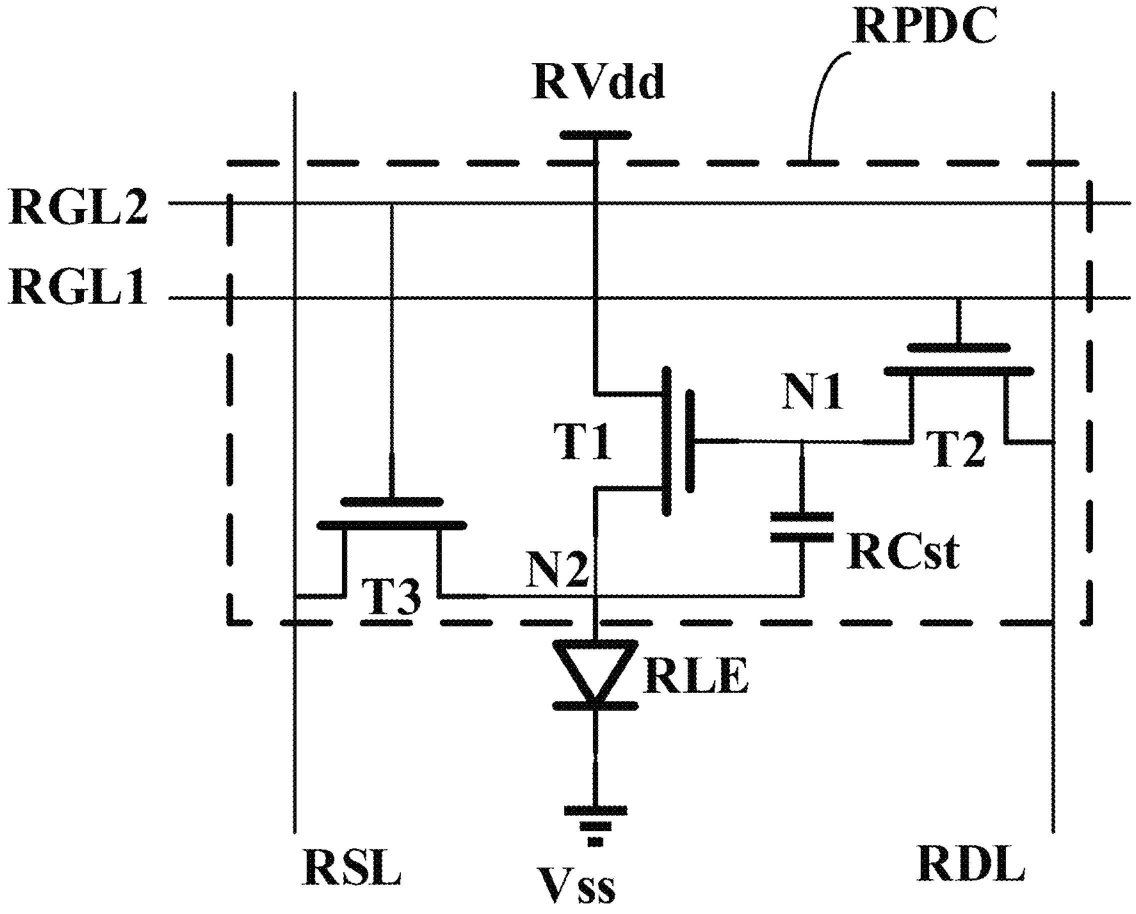
FIG. 6 is a circuit diagram illustrating the structure of a respective pixel driving circuit in some embodiments according to the present disclosure.

FIG. 6 is a circuit diagram illustrating the structure of a respective pixel driving circuit in some embodiments according to the present disclosure. Referring to FIG. 6, the respective pixel driving circuit RPDC is connected to a respective light emitting element RLE. In some embodiments, the respective pixel driving circuit RPDC includes a respective storage capacitor RCst having a first capacitor electrode coupled to a first node N1 and a second capacitor electrode coupled to a second node N2; a driving transistor T1 having a first electrode coupled to a respective voltage supply line Vdd, a second electrode coupled to the second node N2, and a gate electrode coupled to the first node N1; a switching transistor T2 having a first electrode coupled to a respective data line RDL, a second electrode coupled to the first node N1, and a gate electrode coupled to a respective first gate line RGL1; and a sensing transistor T3 having a first electrode coupled to the respective sensing line RSL, a second electrode coupled to the second node N2, and a gate electrode coupled to a respective second gate line RGL2. The first node N1 is coupled to the gate electrode of the driving transistor T1, the second electrode of the switching transistor T2, and the first capacitor electrode of the respective storage capacitor RCst. The second node N2 is coupled to the second electrode of the driving transistor T1, the second electrode of the sensing transistor T3, the second capacitor electrode of the respective storage capacitor RCst, and an anode of a respective light emitting element LE. Various appropriate light emitting elements may be used in the present array substrate. Examples of appropriate light emitting elements include organic light emitting diodes, quantum dots light emitting diodes, and micro light emitting diodes. Optionally, the light emitting element is micro light emitting diode. Optionally, the light emitting element is an organic light emitting diode including an organic light emitting layer.

As used herein, in the context of a transistor, a first electrode in some embodiments refers to a source electrode, and a second electrode in some embodiments refers to a drain electrode.

In another aspect, the present disclosure further provides a pixel compensation method. In some embodiments, the pixel compensation method includes, in a sensing voltage write-in stage, providing a turning-on voltage signal to a respective first gate line to turn on a switching transistor in a respective pixel driving circuit; providing a turning-on voltage signal to a respective second gate line to turn on a sensing transistor in the respective pixel driving circuit; controlling a first sensing switch of a data driving integrated circuit in a conductive state to electrically connect a first reference voltage line to a respective sensing line while maintaining a second sensing switch and a third sensing switch of the data driving integrated circuit in a non-conductive state; providing a first reference voltage signal to the respective sensing line through the first reference voltage line; and providing a sensing voltage signal to a first electrode of the switching transistor through a respective data line, the sensing voltage signal passing through the switching transistor to a first node coupled to a gate electrode of a driving transistor, a drain electrode of the switching transistor, and a first capacitor electrode of a storage capacitor.

Figure 7A:
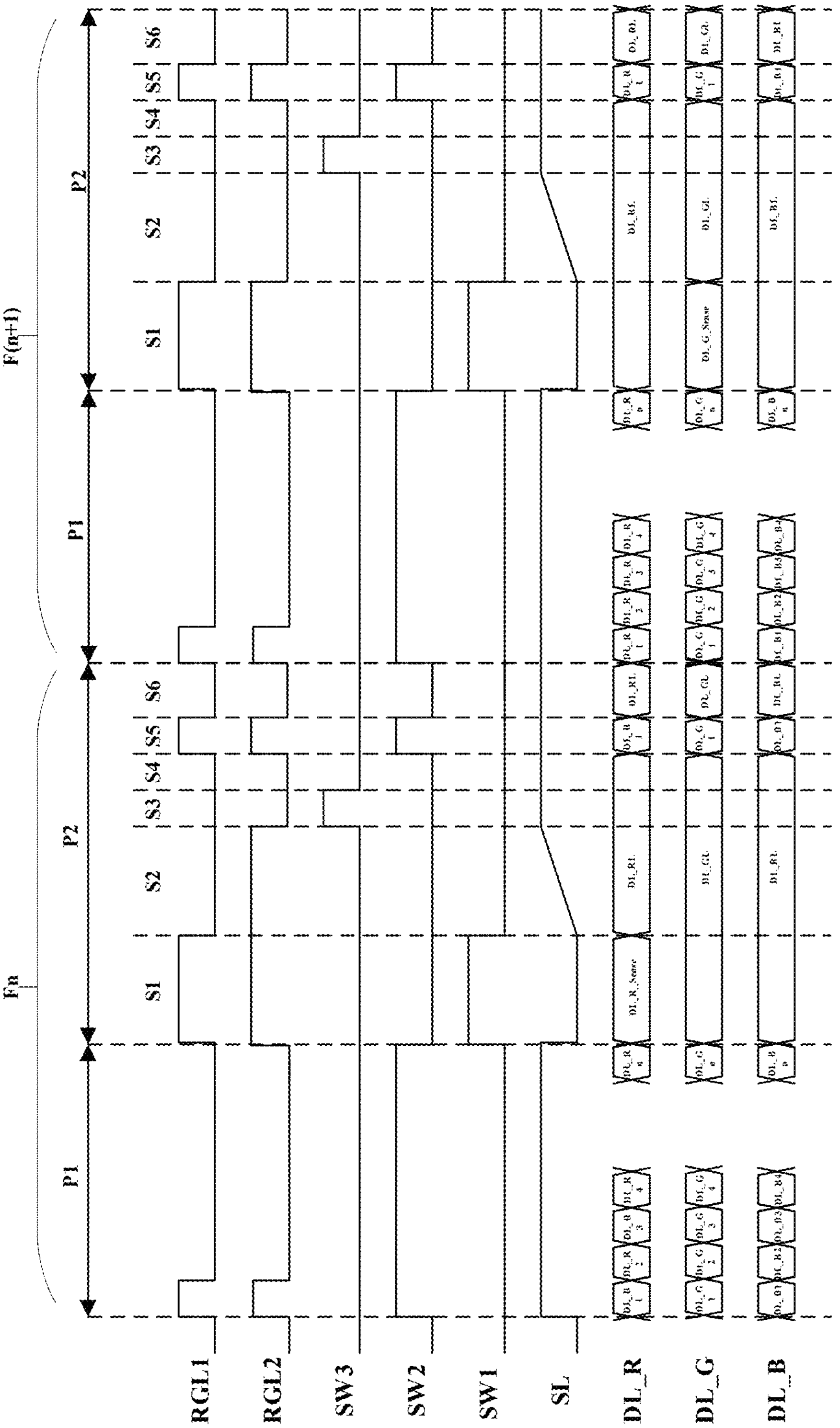
FIG. 7A is a timing diagram of operating a display apparatus in some embodiments according to the present disclosure.
Figure 7B:
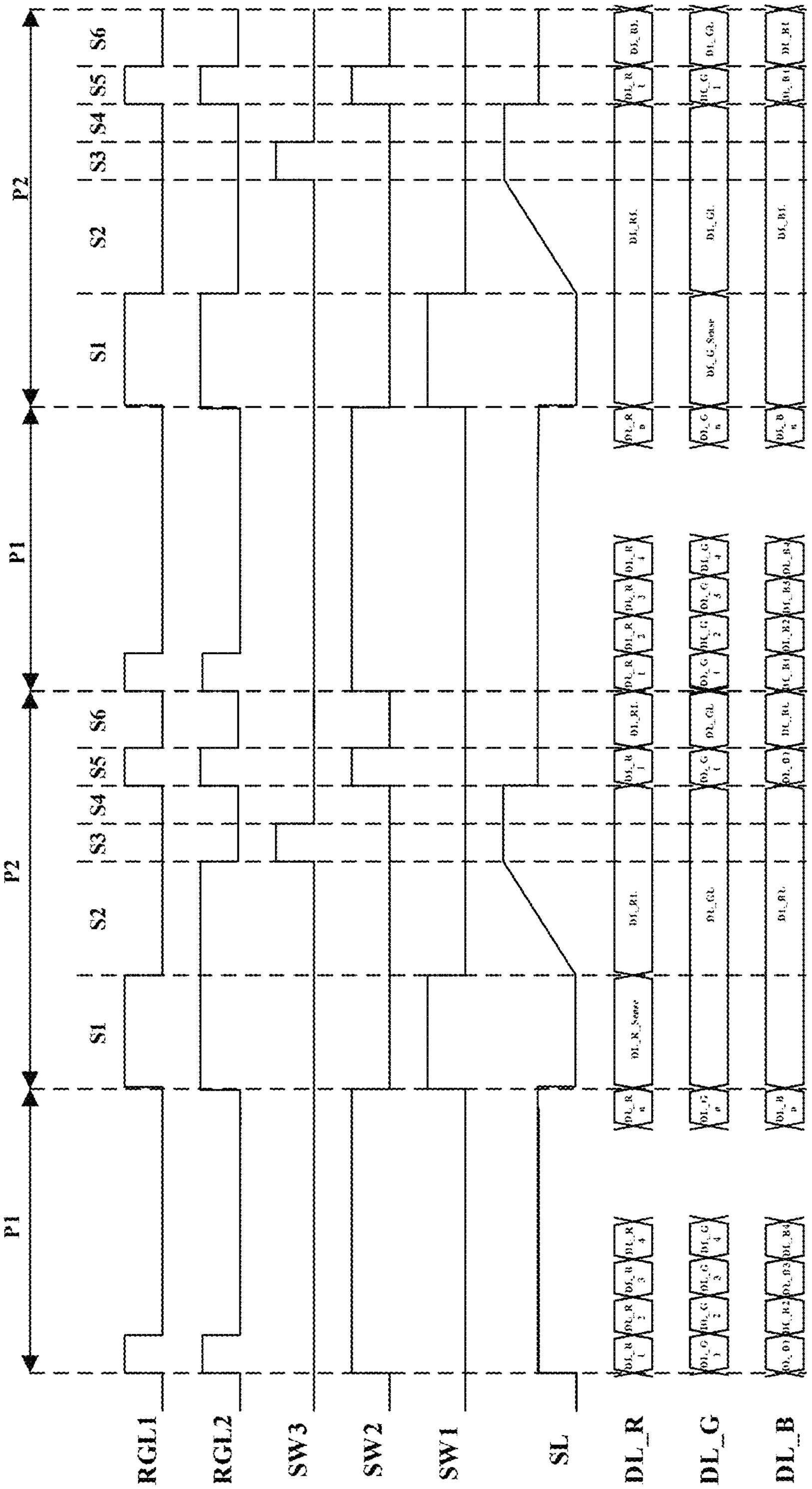
FIG. 7B is a timing diagram of operating a display apparatus in some embodiments according to the present disclosure.

FIG. 7A is a timing diagram of operating a display apparatus in some embodiments according to the present disclosure. FIG. 7B is a timing diagram of operating a display apparatus in some embodiments according to the present disclosure. FIG. 7A and FIG. 7B show the operation of a display apparatus having a format depicted in FIG. 4. The descriptions of the operation generally also apply to the operation of a display apparatus having a format depicted in FIG. 5. Referring to FIG. 7A and FIG. 7B, the operation of the display apparatus includes an image display period P1 and a sensing period P2 subsequent to the image display period P1. In FIG. 7A and FIG. 7B, a present frame of image Fn and a next adjacent frame of image F(n+1) are shown.

In the image display period P1, referring to FIG. 7A, FIG. 7B, FIG. 4, and FIG. 6, a turning-on voltage signal is provided to the respective first gate line RGL1 (e.g., row-by-row) to turn on the switching transistor T2 in a respective pixel driving circuit RPDC; a turning-on voltage signal is provided to the respective second gate line RGL2 to turn on the sensing transistor T3 in the respective pixel driving circuit RPDC; a respective data signal (for example, a respective one of DL_R1 to DL_Rn, DL_G1 to DL_Gn, and DL_B1 to DL_Bn depicted in FIG. 7A and FIG. 7B) is provided to a first electrode of the switching transistor T2 through the respective data line RDL, the respective data signal passing through the switching transistor T2 to the first node N1. The data driving voltage (e.g., Vdata) is written into the gate electrode of the driving transistor T1 (and the first capacitor electrode of the respective storage capacitor RCst) through the respective data line RDL. As a result, the data driving voltage is stored in the respective storage capacitor RCst.

In the image display period P1, the second sensing switch SW2 of the data driving integrated circuit is controlled in a conductive state to electrically connect a second reference voltage line Vref2 to the respective sensing line RSL while the first sensing switch SW1 and the third sensing switch SW3 of the data driving integrated circuit are maintained in a non-conductive state. A second reference voltage signal (e.g., 1 V) is provided to the respective sensing line RSL through the second reference voltage line Vref2, and then transferred to the second capacitor electrode of the respective storage capacitor RCst. The second reference voltage signal is a relatively high voltage signal (as compared to the first reference voltage signal). The voltage level at the anode of the respective light emitting element RLE is reset by the sensing line SL (e.g., to the voltage level of the second reference voltage signal).

Subsequently in the image display period P1, a turning-off voltage signal is provided to the respective first gate line RGL1 (e.g., row-by-row) to turn off the switching transistor T2 in a respective pixel driving circuit RPDC; a turning-off voltage signal is provided to the respective second gate line RGL2 to turn off the sensing transistor T3 in the respective pixel driving circuit RPDC. The driving transistor T1 is turned on by the data driving voltage, and working in a saturation area. A voltage supply signal (e.g., a VDD signal) is provided to the first electrode of the driving transistor T1, the driving transistor T1 generates a driving current. The driving current flows through the respective light emitting element RLE, driving the respective light emitting element RLE to emit light.

Referring to FIG. 7A and FIG. 7B again, in some embodiments, the sensing period P2 includes one or more of a sensing voltage write-in stage S1, a charging stage S2, a sensing stage S3, a conversion stage S4, a data write-back stage S5, and an idle stage S6. In FIG. 7A and FIG. 7B, for illustration purpose only, pixel compensation for one subpixel (e.g., one red subpixel in the present frame of image Fn, or one green subpixel in the next adjacent frame of image F(n+1)) is depicted. However, it is understood that the operations in the sensing period P2 are repeated for a plurality of subpixels (e.g., all subpixels one-by-one) in the display apparatus.

Referring to FIG. 7A, FIG. 7B, FIG. 4, and FIG. 6, in the sensing voltage write-in stage S1, the pixel compensation method in some embodiments includes providing a turning-on voltage signal to a respective first gate line RGL1 to turn on a switching transistor T2 in a respective pixel driving circuit RPDC; providing a turning-on voltage signal to a respective second gate line RGL2 to turn on a sensing transistor T3 in the respective pixel driving circuit RPDC; controlling a first sensing switch SW1 of a data driving integrated circuit in a conductive state to electrically connect a first reference voltage line Vref1 to a respective sensing line RSL while maintaining a second sensing switch SW2 and a third sensing switch SW3 of the data driving integrated circuit in a non-conductive state; providing a first reference voltage signal (e.g., 0 V) to the respective sensing line through the first reference voltage line Vref1; and providing a sensing voltage signal to a first electrode of the switching transistor through a respective data line, the sensing voltage signal passing through the switching transistor to a first node coupled to a gate electrode of a driving transistor, a drain electrode of the switching transistor, and a first capacitor electrode of a storage capacitor. Optionally, the first reference voltage signal is a low voltage signal (e.g., a ground voltage signal), to ensure initial states of the plurality of sensing lines are the same. Optionally, a duration of the sensing voltage write-in stage S1 is approximately 100 μs.

FIG. 7A and FIG. 7B show the operation of a display apparatus having a format depicted in FIG. 4, in which a respective sensing line RSL is coupled to three columns of pixel driving circuits. Thus, the respective sensing line RSL is shared among three subpixels in a same row. For example, the respective sensing line RSL is shared among a red subpixel, a green subpixel, and a blue subpixel. As shown in FIG. 7A and FIG. 7B, when the sensing is performed in a red subpixel in the present frame of image Fn, the sensing voltage signal (e.g., DL_R_Sense) having a relatively high voltage level is provided to the first electrode of the switching transistor T2 in the red subpixel through a respective data line (e.g., DL_R). Because the respective sensing line RSL is shared among a red subpixel, a green subpixel, and a blue subpixel, it is necessary to prevent the sensing performance in the blue subpixel and the green subpixel to avoid interference. Accordingly, when the sensing voltage signal (e.g., DL_R_Sense) having a relatively high voltage level is provided to the first electrode of the switching transistor T2 in the red subpixel through a respective data line (e.g., DL_R), a low voltage signal (e.g., 0 V) is provided to first electrodes of the switching transistor T2 in subpixels of other colors (e.g., blue subpixels and green subpixels) respectively through other respective data lines (e.g., DL_G and DL_B). This ensures that a charging current in a subsequent charging stage would not flow through the driving transistors in the blue subpixels and green subpixels. Interference among adjacent subpixels may be avoided.

Similarly, in the next adjacent frame of image F(n+1), the sensing is performed in a green subpixel in the next adjacent frame of image F(n+1), the sensing voltage signal (e.g., DL_G_Sense) having a relatively high voltage level is provided to the first electrode of the switching transistor T2 in the green subpixel through a respective data line (e.g., DL_G), whereas a low voltage signal (e.g., 0 V) is provided to first electrodes of the switching transistor T2 in subpixels of other colors (e.g., red subpixels and blue subpixel) respectively through other respective data lines (e.g., DL_R and DL_B). This ensures that a charging current in a subsequent charging stage would not flow through the driving transistors in the red subpixels and green subpixels. Interference among adjacent subpixels may be avoided.

Referring to FIG. 7A, FIG. 7B, FIG. 4, and FIG. 6, in a charging stage S2, the pixel compensation method further includes controlling the first sensing switch SW1, a second sensing switch SW2, and a third sensing switch SW3 of the data driving integrated circuit respectively in a non-conductive state; providing a turning-off voltage signal to the respective first gate line RGL1 to turn off the switching transistor T2 in the respective pixel driving circuit; providing a turning-on voltage signal to the respective second gate line RGL2 to turn on the sensing transistor T3 in the respective pixel driving circuit; and providing a voltage signal to a respective voltage supply line RVdd coupled to a first electrode of the driving transistor T1, allowing a charging current to flow through the driving transistor T1, thereby charging the respective sensing line RSL. Optionally, a duration of the charging stage S2 is approximately 120 μs.

As discussed in the context of the sensing voltage write-in stage S1, in the sensing voltage write-in stage S1 in the present frame of image Fn, the sensing voltage signal (e.g., DL_R_Sense) having a relatively high voltage level is provided to the first electrode of the switching transistor T2 in the red subpixel through a respective data line (e.g., DL_R), whereas a low voltage signal (e.g., 0 V) is provided to first electrodes of the switching transistor T2 in subpixels of other colors (e.g., blue subpixels and green subpixels) respectively through other respective data lines (e.g., DL_G and DL_B). In the charging stage S2 in the present frame of image Fn, a charging current flows through the driving transistor T1 in the red subpixel, whereas a charging current would not flow through the driving transistors in the blue subpixels and green subpixels. Interference among adjacent subpixels may be avoided.

Similarly, as discussed in the context of the sensing voltage write-in stage S1, in the sensing voltage write-in stage S1 in the next adjacent frame of image F(n+1), the sensing is performed in a green subpixel in the next adjacent frame of image F(n+1), the sensing voltage signal (e.g., DL_G_Sense) having a relatively high voltage level is provided to the first electrode of the switching transistor T2 in the green subpixel through a respective data line (e.g., DL_G), whereas a low voltage signal (e.g., 0 V) is provided to first electrodes of the switching transistor T2 in subpixels of other colors (e.g., red subpixels and blue subpixel) respectively through other respective data lines (e.g., DL_R and DL_B). In the charging stage S2 in the present frame of image Fn, a charging current flows through the driving transistor T1 in the green subpixel, whereas a charging current would not flow through the driving transistors in the red subpixels and blue subpixels. Interference among adjacent subpixels may be avoided.

The descriptions of the operation in the sensing voltage write-in stage S1 and the charging stage S2 generally also apply to the operation of a display apparatus having a format depicted in FIG. 5. In the format depicted in FIG. 5, the respective sensing line RSL is shared among two red subpixels, two green subpixels, and two blue subpixels. When the sensing is performed in a first red subpixel in the present frame of image Fn, the sensing voltage signal having a relatively high voltage level is provided to the first electrode of the switching transistor T2 in the red subpixel through a respective data line (e.g., DL_R), whereas a low voltage signal (e.g., 0 V) is provided to first electrodes of the switching transistor T2 in two blue subpixels, two green subpixel, and another red subpixel. In the charging stage S2 in the present frame of image Fn, a charging current flows through the driving transistor T1 in the first red subpixel, whereas a charging current would not flow through the driving transistors in two blue subpixels, two green subpixel, and another red subpixel. Interference among adjacent subpixels may be avoided. Similarly, when the sensing is performed in a green subpixel in the next adjacent frame of image F(n+1), the sensing voltage signal having a relatively high voltage level is provided to the first electrode of the switching transistor T2 in the first green subpixel through a respective data line (e.g., DL_G), whereas a low voltage signal (e.g., 0 V) is provided to first electrodes of the switching transistor T2 in two red subpixels, two blue subpixels, and another green subpixel. Interference among adjacent subpixels may be avoided. In the charging stage S2 in the next adjacent frame of image F(n+1), a charging current flows through the driving transistor T1 in the first green subpixel, whereas a charging current would not flow through the driving transistors in the two red subpixels, two blue subpixels, and another green subpixel. Interference among adjacent subpixels may be avoided.

In some embodiments, the respective sensing line RSL is charged from a voltage level of the first reference voltage signal to a voltage level within a conversion voltage range of an analog-to-digital converter of the data driving integrated circuit. In one example, the conversion voltage range of the analog-to-digital converter is, for example, 1 V to 4V. In another example, the respective sensing line RSL is charged from a voltage level of the first reference voltage signal to, e.g., 1 V (as shown in FIG. 7A).

Optionally, the respective sensing line RSL is charged from a voltage level of the first reference voltage signal to a medium voltage level of the conversion voltage range of the analog-to-digital converter (e.g., 2.5 V). In another example, the respective sensing line RSL is charged from a voltage level of the first reference voltage signal to, e.g., 2.5 V (as shown in FIG. 7B). By having the charged voltage level of the respective sensing line RSL to approximately the medium voltage level of the conversion voltage range, conversion accuracy can be significantly enhanced.

In some embodiments, in the charging stage S2, the pixel compensation method further includes discontinuing data voltage signal to any data line (e.g., DL_R, DL_G, DL_B in FIG. 7A and FIG. 7B). In one example, the data line is provided with a voltage signal of 0 V (e.g., DL_RL, DL_GL, DL_BL in FIG. 7A and FIG. 7B).

Referring to FIG. 7A, FIG. 7B, FIG. 4, and FIG. 6, in a sensing stage S3 subsequent to the charging stage S2, the pixel compensation method further includes controlling the third sensing switch SW3 of the data driving integrated circuit in a conductive state to electrically connect the respective sensing line RSL to the analog-to-digital converter while maintaining the first sensing switch SW1 and the second sensing switch SW2 of the data driving integrated circuit in a non-conductive state. In the sensing stage S3, the pixel compensation method further includes providing the turning-off voltage signal to the respective first gate line RGL1 to turn off the switching transistor T2 in the respective pixel driving circuit; providing the turning-off voltage signal to the respective second gate line RGL2 to turn off the sensing transistor T3 in the respective pixel driving circuit. Optionally, a duration of the sensing stage S3 is approximately 40 μs.

In some embodiments, in the sensing stage S3, the pixel compensation method further includes discontinuing data voltage signal to any data line (e.g., DL_R, DL_G, DL_B in FIG. 7A and FIG. 7B). In one example, the data line is provided with a voltage signal of 0 V (e.g., DL_RL, DL_GL, DL_BL in FIG. 7A and FIG. 7B).

Referring to FIG. 7A, FIG. 7B, FIG. 4, and FIG. 6, in a conversion stage S4, the pixel compensation method further includes converting a respective analog sensing signal from a respective sensing line RSL to a respective digital sensing signal; and outputting the respective digital sensing signal to a timing controller. In the conversion stage S4, the pixel compensation method further includes providing the turning-off voltage signal to the respective first gate line RGL1 to turn off the switching transistor T2 in the respective pixel driving circuit; providing the turning-off voltage signal to the respective second gate line RGL2 to turn off the sensing transistor T3 in the respective pixel driving circuit; and controlling the first sensing switch SW1, the second sensing switch SW2, and the third sensing switch SW3 of the data driving integrated circuit in a non-conductive state. The conversion occurs in the analog-to-digital converter of the data integrated circuit. Optionally, a duration of the conversion stage S4 is approximately 10 us to 100 μs. The duration of the conversion stage S4 is at least partially correlated to display resolution and conversion rate.

In some embodiments, in the conversion stage S4, the pixel compensation method further includes discontinuing data voltage signal to any data line (e.g., DL_R, DL_G, DL_B in FIG. 7A and FIG. 7B). In one example, the data line is provided with a voltage signal of 0 V (e.g., DL_RL, DL_GL, DL_BL in FIG. 7A and FIG. 7B).

Referring to FIG. 7A, FIG. 7B, FIG. 4, and FIG. 6, in a data write-back stage S5 subsequent to a charging stage S3 and a conversion stage S4, the pixel compensation method further includes controlling the second sensing switch SW2 of the data driving integrated circuit in a conductive state to electrically connect a second reference voltage line Vref2 to the respective sensing line RSL while maintaining the first sensing switch SW1 and the third sensing switch SW3 of the data driving integrated circuit in a non-conductive state; providing a second reference voltage signal (e.g., 1 V) to the respective sensing line through the second reference voltage line Vref2; providing the turning-on voltage signal to the respective first gate line RGL1 to turn on the switching transistor T2 in a respective pixel driving circuit RPDC; providing the turning-on voltage signal to the respective second gate line RGL2 to turn on the sensing transistor T2 in the respective pixel driving circuit RPDC; and providing a respective data signal (e.g., DL_R1, DL_G1, DL_B1 depicted in FIG. 7A and FIG. 7B) to the first electrode of the switching transistor T2 through the respective data line RDL, the respective data signal passing through the switching transistor T2 to the first node N1. Optionally, the second reference voltage signal has a voltage level higher than a voltage level of the first reference voltage signal. Optionally, a duration of the data write-back stage S5 is approximately a display duration of 1 to 3 rows of subpixels.

In the charging stage S2, the sensing stage S3, and the conversion stage S4, the data lines (e.g., DL_R, DL_G, DL_B in FIG. 7A and FIG. 7B) are provided with a voltage signal of 0 V (e.g., DL_RL, DL_GL, DL_BL in FIG. 7A and FIG. 7B), and the voltage level at the first node N1 is lowered to 0 V. Prior to the image display period P1 in the next adjacent frame of image F(n+1), the voltage level at the first node N1 is increased to the voltage level of the respective data signal (e.g., DL_R1, DL_G1, DL_B1 depicted in FIG. 7A and FIG. 7B), to avoid flickering between the present frame of image Fn and the next adjacent frame of image F(n+1). By having the data write-back stage S5, the voltage level at the first node N1 is increased to the voltage level of the respective data signal.

Referring to FIG. 7A, FIG. 7B, FIG. 4, and FIG. 6, in an idle stage S6 subsequent to the data write-back stage S5, the pixel compensation method further includes controlling the first sensing switch SW1, the second sensing switch SW2, and the third sensing switch SW3 of the data driving integrated circuit respectively in the non-conductive state; providing a turning-off voltage signal to the respective first gate line RGL1 to turn off the switching transistor T2 in the respective pixel driving circuit RPDC; and providing a turning-on voltage signal to the respective second gate line RGL2 to turn on the sensing transistor T3 in the respective pixel driving circuit RPDC.

In some embodiments, in the idle stage S6, the pixel compensation method further includes discontinuing data voltage signal to any data line (e.g., DL_R, DL_G, DL_B in FIG. 7A and FIG. 7B). In one example, the data line is provided with a voltage signal of 0 V (e.g., DL_RL, DL_GL, DL_BL in FIG. 7A and FIG. 7B). Because the switching transistor T2 is turned off in the idle stage S6, the voltage level at the first node N1 is maintained at the voltage level of the respective data signal.

Referring to FIG. 7A, FIG. 7B, FIG. 4, and FIG. 6, in an image display period (e.g., P1 in the next adjacent frame of image F(n+1)) subsequent to a sensing period P2 in the present frame of image Fn, the pixel compensation method further includes controlling the second sensing switch SW2 of the data driving integrated circuit in a conductive state to electrically connect a second reference voltage line Vref2 to the respective sensing line RSL while maintaining the first sensing switch SW1 and the third sensing switch SW3 of the data driving integrated circuit in a non-conductive state; providing a second reference voltage signal (e.g., 1 V) to the respective sensing line RSL through the second reference voltage line Vref2; providing the turning-on voltage signal to the respective first gate line RGL1 to turn on the switching transistor T2 in a respective pixel driving circuit RPDC; providing the turning-on voltage signal to the respective second gate line RGL2 to turn on the sensing transistor T2 in the respective pixel driving circuit RPDC; and providing a respective data signal to the first electrode of the switching transistor T2 through the respective data line RDL, the respective data signal passing through the switching transistor T2 to the first node N1. Optionally, the second reference voltage signal has a voltage level higher than a voltage level of the first reference voltage signal.

Figure 8:
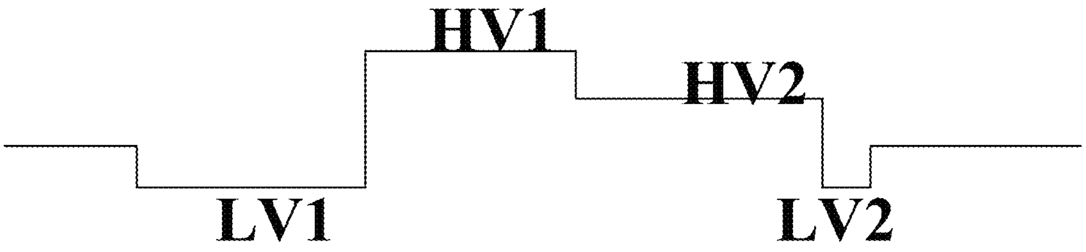
FIG. 8 is a representation of a waveform of a sensing voltage signal in some embodiments according to the present disclosure.

As discussed above, in some embodiments, in the sensing voltage write-in stage S1, a sensing voltage signal (e.g., DL_R_Sense and DL_G_Sense as depicted in FIG. 7A and FIG. 7B) is provided to the first electrode of the switching transistor through the respective data line RDL, the sensing voltage signal passing through the switching transistor to the first node N1. FIG. 8 is a representation of a waveform of a sensing voltage signal in some embodiments according to the present disclosure. Referring to FIG. 8, the sensing voltage signal in some embodiments includes consecutively a first low voltage level LV1, a first high voltage level HV1, a second high voltage level HV2, and a second low voltage level LV2. Optionally, the first high voltage level HV1 is higher than the second high voltage level HV2. Optionally, the second high voltage level HV2 is higher than a voltage level of a threshold voltage Vth of the driving transistor.

Figure 9:
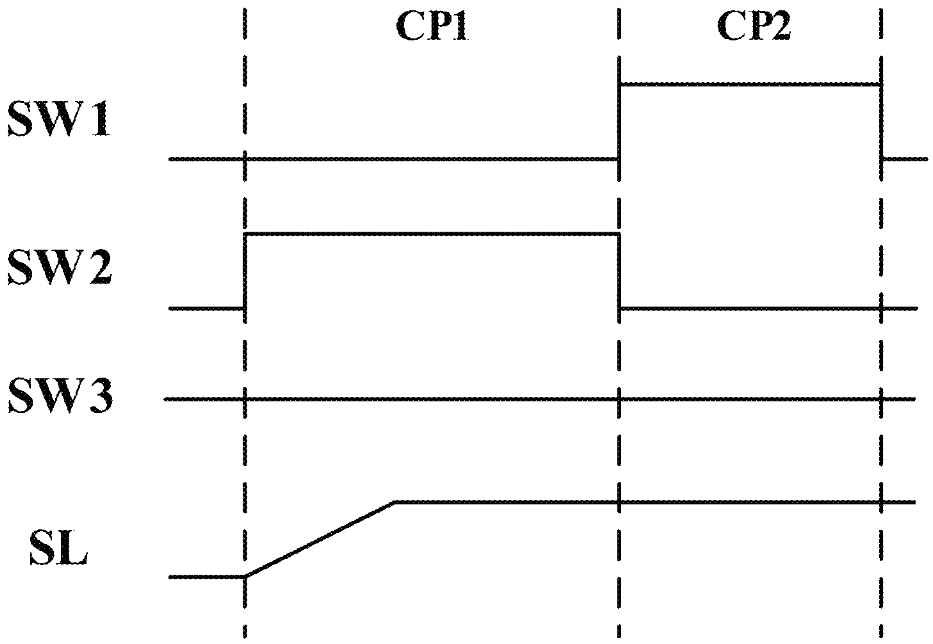
FIG. 9 illustrates a process of calibrating a plurality of analog-to-digital converters in some embodiments according to the present disclosure.

In some embodiments, the display apparatus may include one or more data driving integrated circuits, and a respective data driving integrated circuit may include one or more analog-to-digital converters. The plurality of analog-to-digital converters in the display apparatus may output digital signals having different values, upon receiving a same analog signal. Thus, it is desirable to calibrate the plurality of analog-to-digital converters in the display apparatus. FIG. 9 illustrates a process of calibrating a plurality of analog-to-digital converters in some embodiments according to the present disclosure. Referring to FIG. 9 and FIG. 1, in some embodiments, calibrating the plurality of analog-to-digital converters includes in a first calibration stage CP1, controlling the second sensing switch SW2 of a respective data driving integrated circuit in a conductive state to electrically connect a second reference voltage line Vref2 to the respective sensing line RSL while maintaining the first sensing switch SW1 and the third sensing switch SW3 of the respective data driving integrated circuit in a non-conductive state; and providing a second reference voltage signal (e.g., 1 V) to the respective sensing line through the second reference voltage line Vref2.

In some embodiments, calibrating the plurality of analog-to-digital converters further includes in a second calibration stage CP2, controlling the third sensing switch SW3 of the respective data driving integrated circuit in a conductive state to electrically connect the respective sensing line RSL to the respective analog-to-digital converter ADC while maintaining the first sensing switch SW1 and the second sensing switch SW2 of the respective data driving integrated circuit in a non-conductive state; converting a respective analog sensing signal to a respective digital sensing signal by the respective analog-to-digital converter; and outputting the respective digital sensing signal to a timing controller. Values of a plurality of analog sensing signals respectively converted by the plurality of analog-to-digital converters are used for calibrating the plurality of analog-to-digital converters with respect to each other.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, comprising:

a data driving integrated circuit;

a plurality of data lines respectively coupled to the data driving integrated circuit;

a plurality of sensing line respectively coupled to the data driving integrated circuit;

wherein a respective sensing line of the plurality of sensing line is coupled to a plurality of columns of pixel driving circuits; and at least two subpixels in a same row are directly connected to a sensing line of the plurality of sensing line;

wherein the display apparatus further comprises:

a first sensing switch configured to control a connection between a first reference voltage line and the sensing line;

a second sensing switch configured to control a connection between a second reference voltage line and the sensing line; and a third sensing switch configured to control the connection between an analog-to-digital converter and the sensing line.

2. The display apparatus of claim 1, wherein the respective sensing line is coupled to n columns of pixel driving circuits, n number of pixel driving circuits in a respective row of n columns of pixel driving circuits being respectively connected to n number of light emitting elements respectively in n number of subpixels.

3. The display apparatus of claim 1, wherein the respective sensing line is coupled to 2n columns of pixel driving circuits, 2n number of pixel driving circuits in a respective row of 2n columns of pixel driving circuits being respectively connected to 2n number of light emitting elements respectively in 2n number of subpixels.

4. The display apparatus of claim 1, further comprising a plurality of pixel driving circuits and a plurality of light emitting diodes;

wherein a respective pixel driving circuit comprises:

a storage capacitor having a first capacitor electrode coupled to a first node and a second capacitor electrode coupled to a second node;

a driving transistor having a first electrode coupled to a respective voltage supply line, a second electrode coupled to the second node, and a gate electrode coupled to the first node;

a switching transistor having a first electrode coupled to a respective data line, a second electrode coupled to the first node, and a gate electrode coupled to a respective first gate line; and a sensing transistor having a first electrode coupled to the respective sensing line, a second electrode coupled to the second node, and a gate electrode coupled to a respective second gate line.

5. A display apparatus, comprising:

a data driving integrated circuit;

a plurality of data lines respectively coupled to the data driving integrated circuit;

a plurality of sensing line respectively coupled to the data driving integrated circuit;

wherein a respective sensing line of the plurality of sensing line is coupled to a plurality of columns of pixel driving circuits; and at least two subpixels in a same row are connected to a same sensing line;

wherein the data driving integrated circuit comprises:

a digital-to-analog converter configured to receive a respective digital data signal from a timing controller and convert the respective digital data signal to a respective analog data signal, which is output to a display panel through a respective data line;

an analog-to-digital converter configured to receive a respective analog sensing signal from a respective sensing line in the display panel and convert respective analog sensing signal to a respective digital sensing signal, which is output to the timing controller;

a first sensing switch configured to control a connection between a first reference voltage line and the respective sensing line;

a second sensing switch configured to control a connection between a second reference voltage line and the respective sensing line; and a third sensing switch configured to control the connection between the analog-to-digital converter and the respective sensing line.

6. The display apparatus of claim 5, wherein the first reference voltage line configured to provide a first reference voltage signal; and the second reference voltage line configured to provide a second reference voltage signal.

7. A pixel compensation method, comprising:

in a sensing voltage write-in stage, providing a turning-on voltage signal to a respective first gate line to turn on a switching transistor in a respective pixel driving circuit;

providing a turning-on voltage signal to a respective second gate line to turn on a sensing transistor in the respective pixel driving circuit;

controlling a first sensing switch of a data driving integrated circuit in a conductive state to electrically connect a first reference voltage line to a respective sensing line while maintaining a second sensing switch and a third sensing switch of the data driving integrated circuit in a non-conductive state;

providing a first reference voltage signal to the respective sensing line through the first reference voltage line; and providing a sensing voltage signal to a first electrode of the switching transistor through a respective data line, the sensing voltage signal passing through the switching transistor to a first node coupled to a gate electrode of a driving transistor, a drain electrode of the switching transistor, and a first capacitor electrode of a storage capacitor.

8. The pixel compensation method of claim 7, wherein the second sensing switch is configured to control a connection between a second reference voltage line and the respective sensing line; and the third sensing switch is configured to control a connection between an analog-to-digital converter of the data driving integrated circuit and the respective sensing line.

9. The pixel compensation method of claim 8, further comprising:

in a charging stage, controlling the first sensing switch, the second sensing switch, and the third sensing switch of the data driving integrated circuit respectively in a non-conductive state;

providing a turning-off voltage signal to the respective first gate line to turn off the switching transistor in the respective pixel driving circuit;

providing a turning-on voltage signal to the respective second gate line to turn on the sensing transistor in the respective pixel driving circuit; and providing a voltage signal to a respective voltage supply line coupled to a first electrode of the driving transistor, allowing a charging current to flow through the driving transistor, thereby charging the respective sensing line.

10. The pixel compensation method of claim 9, wherein the respective sensing line is charged from a voltage level of the first reference voltage signal to a voltage level within a conversion voltage range of an analog-to-digital converter of the data driving integrated circuit.

11. The pixel compensation method of claim 9, in the charging stage, further comprising discontinuing data voltage signal to any data line.

12. The pixel compensation method of claim 7, further comprising:

in a sensing stage subsequent to a charging stage, controlling the third sensing switch of the data driving integrated circuit in a conductive state to electrically connect the respective sensing line to an analog-to-digital converter while maintaining the first sensing switch and the second sensing switch of the data driving integrated circuit in a non-conductive state.

13. The pixel compensation method of claim 12, further comprising:

in a conversion stage, converting a respective analog sensing signal from a respective sensing line to a respective digital sensing signal; and outputting a respective digital sensing signal to a timing controller.

14. The pixel compensation method of claim 7, further comprising:

in a data write-back stage subsequent to a charging stage and a conversion stage, controlling the second sensing switch of the data driving integrated circuit in a conductive state to electrically connect a second reference voltage line to the respective sensing line while maintaining the first sensing switch and the third sensing switch of the data driving integrated circuit in a non-conductive state;

providing a second reference voltage signal to the respective sensing line through the second reference voltage line;

providing the turning-on voltage signal to the respective first gate line to turn on the switching transistor in a respective pixel driving circuit;

providing the turning-on voltage signal to the respective second gate line to turn on the sensing transistor in the respective pixel driving circuit; and providing a respective data signal to the first electrode of the switching transistor through the respective data line, the respective data signal passing through the switching transistor to the first node;

wherein the second reference voltage signal has a voltage level higher than a voltage level of the first reference voltage signal.

15. The pixel compensation method of claim 14, further comprising:

in an idle stage subsequent to the data write-back stage, controlling the first sensing switch, the second sensing switch, and the third sensing switch of the data driving integrated circuit respectively in the non-conductive state;

providing a turning-off voltage signal to the respective first gate line to turn off the switching transistor in the respective pixel driving circuit; and providing a turning-on voltage signal to the respective second gate line to turn on the sensing transistor in the respective pixel driving circuit.

16. The pixel compensation method of claim 15, in the idle stage, further comprising discontinuing data voltage signal to any data line.

17. The pixel compensation method of claim 7, further comprising:

in an image display period subsequent to a sensing period, controlling the second sensing switch of the data driving integrated circuit in a conductive state to electrically connect a second reference voltage line to the respective sensing line while maintaining the first sensing switch and the third sensing switch of the data driving integrated circuit in a non-conductive state;

providing a second reference voltage signal to the respective sensing line through the second reference voltage line;

providing the turning-on voltage signal to the respective first gate line to turn on the switching transistor in a respective pixel driving circuit;

providing the turning-on voltage signal to the respective second gate line to turn on the sensing transistor in the respective pixel driving circuit; and providing a respective data signal to the first electrode of the switching transistor through the respective data line, the respective data signal passing through the switching transistor to the first node;

wherein the second reference voltage signal has a voltage level higher than a voltage level of the first reference voltage signal.

18. The pixel compensation method of claim 7, wherein the sensing voltage signal comprises consecutively a first low voltage level, a first high voltage level, a second high voltage level, and a second low voltage level;

wherein the first high voltage level is higher than the second high voltage level; and the second high voltage level is higher than a voltage level of a threshold voltage of the driving transistor.

19. The pixel compensation method of claim 7, further comprising:

calibrating a plurality of analog-to-digital converters in one or more data driving integrated circuits in a display apparatus with respect to each other;

wherein calibrating the plurality of analog-to-digital converters comprises:

in a first calibration stage, controlling the second sensing switch of a respective data driving integrated circuit in a conductive state to electrically connect a second reference voltage line to the respective sensing line while maintaining the first sensing switch and the third sensing switch of the respective data driving integrated circuit in a non-conductive state; and providing a second reference voltage signal to the respective sensing line through the second reference voltage line;

wherein calibrating the plurality of analog-to-digital converters further comprises:

in a second calibration stage, controlling the third sensing switch of the respective data driving integrated circuit in a conductive state to electrically connect the respective sensing line to a respective analog-to-digital converter while maintaining the first sensing switch and the second sensing switch of the respective data driving integrated circuit in a non-conductive state;

converting a respective analog sensing signal to a respective digital sensing signal by the respective analog-to-digital converter; and outputting a respective digital sensing signal to a timing controller;

wherein values of a plurality of analog sensing signals respectively converted by the plurality of analog-to-digital converters are used for calibrating the plurality of analog-to-digital converters with respect to each other.

* * * * *